(12) United States Patent
Zohar et al.

(10) Patent No.: US 7,758,798 B2
(45) Date of Patent: Jul. 20, 2010

(54) PROCESS FOR FABRICATING WEATHERSEALS

(75) Inventors: Avi Zohar, Thornhill (CA); Haruhisa Kawase, Rochester Hills, MI (US); Peter J. Ellis, Rochester Hills, MI (US)

(73) Assignee: Decoma International Inc, Concord, Ontario (CA)

( * ) Notice: Subject to any disclaimer, the term of this patent is extended or adjusted under 35 U.S.C. 154(b) by 241 days.

(21) Appl. No.: 11/985,716

(22) Filed: Nov. 16, 2007

(65) Prior Publication Data
US 2008/0067716 A1    Mar. 20, 2008

Related U.S. Application Data

(62) Division of application No. 10/513,898, filed as application No. PCT/CA03/00665 on May 12, 2003, now abandoned.

(60) Provisional application No. 60/378,120, filed on May 16, 2002.

(51) Int. Cl.
*B29C 53/00* (2006.01)
*B29C 55/00* (2006.01)

(52) U.S. Cl. .................... 264/339; 264/176.1; 264/322; 425/403; 49/490.1; 49/479.1

(58) Field of Classification Search .............. None
See application file for complete search history.

(56) References Cited

U.S. PATENT DOCUMENTS 2,964,796 A * 12/1960 Press ........................ 264/313
3,822,160 A * 7/1974 La Barge et al. ............ 156/212
3,837,957 A    9/1974 Mesnel
4,118,162 A   10/1978 Baumgarten
4,160,006 A    7/1979 Patzner et al.
5,296,067 A *  3/1994 Mesnel et al. .............. 156/221
6,368,700 B1 * 4/2002 Venkataswamy et al. .... 428/217

FOREIGN PATENT DOCUMENTS

DE    34 17 128 A1    11/1985
GB    1 559 251       1/1980
WO    WO 94/29144    12/1994

OTHER PUBLICATIONS

English Abstract of DE 34 17 128 A1 Dated Nov. 21, 1985.
PCT International Search Report for PCT/CA2003/00665 Dated Sep. 16, 2003.

* cited by examiner

*Primary Examiner*—Christina Johnson
*Assistant Examiner*—Benjamin Schiffman
(74) *Attorney, Agent, or Firm*—Clark Hill PLC

(57) ABSTRACT

A process for forming linear, thermoplastic weatherseals into a bend position is provided which avoids buckling of the thinner surfaces of the weatherseal material. The process involves the use of a support insert which supports the thinner surfaces during the bending operation, and thus assists in preventing the deformation of the thinner weatherseal surfaces. The support is preferable constructed of a material which is unaffected by temperatures higher than the heat-deformation temperature used to set the weatherseal material into a bent configuration, and thus, the support insert retains its linear shape when removed from the bending press, and therefore, can be reused. An improved process for manufacturing bent thermoplastic weatherseal material results.

8 Claims, 4 Drawing Sheets

PROCESS FOR FABRICATING WEATHERSEALS

CROSS-REFERENCE TO RELATED APPLICATIONS

This application is a divisional application of U.S. patent application Ser. No. 10/513,898, filed on Nov. 9, 2004, now abandoned which is a national stage application of PCT/CA2003/00665 filed on May 12, 2003, which claims the benefit of U.S. provisional application Ser. No. 60/378,120 filed May 16, 2002.

FIELD OF THE INVENTION

The present invention relates to the field of weatherseals, and in particular, relates to a process for the fabrication of weatherseals for automotive use.

BACKGROUND OF THE INVENTION

Weatherseals, in automotive applications, are primarily used to provide a seal against wind, rain, noise and the like, in situations wherein glass and metal (or other materials) are in contact with each other (in fixed or movable situations), or in situations where metal components (or other materials) are in a movable relationship to one another, such as, for example, a door, trunk or hood opening with respect to the frame or body of the automobile.

Over the years, a wide variety of weatherseal materials have been proposed and used, including rubber, synthetic rubber, rubberized materials, plastics, elastomers and the like. A typical weatherseal might be fabricated of, for example, elastomers, which can be defined as a material which experiences large reversible deformations under relatively low stress. Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber.

Thermoplastic elastomers are elastomers having thermoplastic properties. That is, thermoplastic elastomers are optionally molded or otherwise shaped and reprocessed at temperatures above their melting or softening point. One example of thermoplastic elastomers is styrene-butadiene-styrene (SBS) block copolymer. SBS block copolymers exhibit a two phase morphology consisting of glassy polystyrene domains connected by rubbery butadiene segments. At temperatures between the glass transition temperatures of the butadiene midblock and the styrene endblocks the SBS copolymers act like a crosslinked elastomer.

In contrast, thermoset elastomers are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene monomer rubber (EPDM). EPM materials are made by copolymerization of ethylene and propylene, and are typically cured with peroxides to give rise to crosslinking, and thereby induce thermoset properties. EPDM materials are linear interpolymers of ethylene, propylene, and a nonconjugated diene such as 1,4-hexadiene, dicyclopentadiene, or ethylidene norbornene. EPDM materials are typically vulcanized with sulfur to induce thermoset properties, although they alternatively are optionally cured with peroxides.

Of specific interest in the process of the present invention, however, are weatherseals which comprise materials commonly referred to as thermoplastics and more particularly to "thermoplastic vulcanizates" (TPVs), and even more particularly to weatherseals made from extrudable TPVs.

Thermoplastic vulcanizates (TPV's) are polyolefinic matrices, preferably crystalline, through which thermoset elastomers are generally uniformly distributed. Examples of thermoplastic vulcanizates include EPM and EPDM thermoset materials distributed in a crystalline polypropylene matrix. One example of a commercially available material is Santoprene™, thermoplastic rubber which is manufactured by Advanced Elastomer Systems and is a mixture of crosslinked EPDM particles in a crystalline polypropylene matrix. These materials have found utility in many applications which previously used vulcanized rubber, e.g. hose, gaskets, and the like. In these applications, TPV's are noted for their ability to be processed as thermoplastics while retaining the excellent tensile and compression set properties of vulcanized rubbers.

Commercial TPV materials are typically based on vulcanized rubbers in which a phenolic resin or sulfur cure system is used to vulcanize, that is to crosslink, a diene copolymer rubber by way of dynamic vulcanization, that is crosslinking while mixing (typically vigorously), in a thermoplastic matrix. Sulfur or a phenolic resin is preferred over peroxide free radical cure systems because peroxide degrades a polypropylene or and crosslinks a polyethylene as well as the rubber and this is in turn limits the extent of rubber crosslinking that can occur before the entire mixture degraded or crosslinked and is no longer thermoplastic.

The thermoplastic material of use in the present invention, is preferably extrutable, and thus forms a thermoplastic extrudate. The thermoplastic extrudate is preferably a solid material which is essentially free of macroscopic voids, or alternatively, is a dense foam material having a density in the range greater than about 80% of that of the solid material. It should be noted, however, that the thermoplastic material of interest in the present invention is typically re-processable, unlike a thermoset resin.

By "extrudable" is meant that a material blend can be processed in an available, commercial extruder or injection moulding machine which provides internal mixing at a temperature in the range from, for example, about 180° C. to 240° C. with a residence time less than 5 min, preferably in the range from 30 sec to 2 min. In thermoplastics such as TPVs, which are typically "self-cured" and not physical blends, their combination of desirable elastic and thermoplastic properties depends on the respective amounts of "hard" and "soft" phases provided by each component, and the properties of each component. The polyolefin phase is the continuous "hard" phase in which the rubber "soft" phase is present as discrete particles. By varying the ratios of the components, one may provide desired hardness/softness, oil and temperature resistance, oxidation resistance, and extrudability, inter alia.

Through the use of thermoplastic materials, a weatherseal can be produced which is typically thinner and lighter than weatherseals made of prior art rubber or rubberized materials. Further, the thinner, lighter, thermoplastic weatherseals can provide reduced wind noise, while still providing good other weatherseal properties such as softness, abrasion resistance and low coefficients of friction.

The use of TPV materials as weatherseals has been previously described in, for example, U.S. Pat. Nos. 6,368,700 and 6,277,916. However, while TPV elastomers are used to produce weatherseals, the ever-increasing demands of the marketplace necessitate the development of processing thermoplastic weatherseals with improved properties.

In general, the prior art thermoset weatherseal materials would normally be bent to a desired shape by inserting the linear weatherseal extrudate into a bending press while heating the material to a temperature above its "heat-deformable temperature". The press can then be used to press the material into the appropriate shape. Commonly, this appropriate shape would merely be a right angle bend so that the weatherseal material might be placed in, for example, the corner of a window opening in an automotive application.

Because of its thinner, lighter construction, and the differences in chemical thermosetting properties, thermoplastic weatherseals can be moulded up to 35% faster than prior art EPDM weatherseals. As such, use of thermoplastic weatherseals in bent applications could provide improved efficiencies.

However, thermoplastic extrudates are commonly used in linear, or straight-line applications, or in applications, with only minor amounts of bending. Typically, thermoplastic extrudates are not used in situations where bending to over 20° is required since the bending process can adversely affect the weatherseal. It has been observed that when thermoplastic weatherseal materials are bent using the above described bending process, a common occurrence is for the thinner sections of the extruded weatherseal to "buckle" and otherwise deform. If used in this condition, it would be difficult to achieve an effective, acceptable seal, and thus, leakage of water and/or an increase in wind noise would be possible, and would likely be probable.

The buckling effect is most noticeable on thinner sections (in cross section) of the thermoplastic material being bent, and the amount of buckling observed will be dependent on the material utilized, the heat deformation temperature for that material, the bending temperature use, the amount of time that the material is in the bending press, and the like. The buckling effect is typically characterized by a wavy, or non-linear deformation of a previously straight component of the extruded seal, after the bending operation. A typical example of this effect would be observed when, for example, an extruded thermoplastic weatherseal was bent 90° to fit in an automotive window or door application. After the bent area had been subjected to the heat and pressure encountered in a bending press, the thinner sections of the weatherseal would have a wavy appearance in the bent area.

To overcome this difficulty, it would be advantageous to provide a process for the bending of thermoplastic extrudate weatherseal materials, in a typical prior art bending device, which would provide a bent thermoplastic material with a reduced level of buckling, when compared to prior art process, and more preferably, would provide a process which eliminates the buckling effect essentially completely.

SUMMARY OF THE INVENTION

Accordingly, it is a principal advantage of the present to provide a process for bending of thermoplastic weatherseals, and preferably a thermoplastic elastomer and in particular, a TPV extrudate weatherseal, which minimizes the buckling effect when the TPV material is bent.

It is a further advantage of the present invention to provide a process for bending of thermoplastic materials which minimizes the buckling effect while using bending devices substantially in accordance with the bending devices of the prior art.

The advantages set out hereinabove, as well as other objects and goals inherent thereto, are at least partially or fully provided by the process of the present invention, as set out herein below.

Accordingly, in one aspect, the present invention provides a process for forming thermoplastic weatherseals into a bent condition comprising:

a) inserting a bendable support insert into at least a portion of a linear, straight thermoplastic weatherseal material to provide a bendable weatherseal assembly;

b) inserting the bendable weatherseal assembly into a bending press, and activating the press in order to bend the weatherseal assembly into a bent condition;

c) heating the weatherseal assembly in the bent condition to a bending temperature greater than the heat deformation temperature of the thermoplastic material;

d) maintaining the assembly in the press until the thermoplastic material is set into the bent position; and d) removing the weatherseal assembly from the press, and removing the support insert from the thermoplastic weatherseal material. The thermoplastic weatherseal material essentially maintains the bent condition when removed from the press.

In a further aspect, the present invention also provides a support insert for use in the operation of forming thermoplastic weatherseals into a bent position comprising a base structure manufactured of a flexible material, having at least one face of which corresponds to the surface of the thermoplastic weatherseal, so as to support the weatherseal during a bending process. The flexible material is essentially non-reactive with the thermoplastic weatherseal.

In a still further aspect, the present invention also provides for the use of a thermoplastic weatherseal, and preferably a TPV weatherseal, which has been formed to a bent condition using the process of described hereinabove with respect to the present invention

BRIEF DESCRIPTION OF THE DRAWINGS

Embodiments of this invention will now be described by way of example only in association with the accompanying drawings in which.

DETAILED DESCRIPTION OF THE INVENTION

Figure 1:
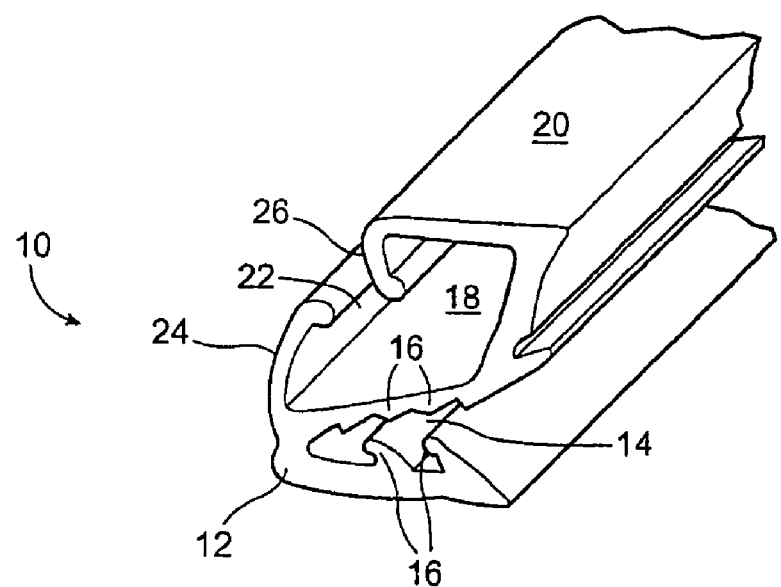
FIG. 1 is a perspective view of an essentially linear thermoplastic extrudate weatherseal.
Figure 2:
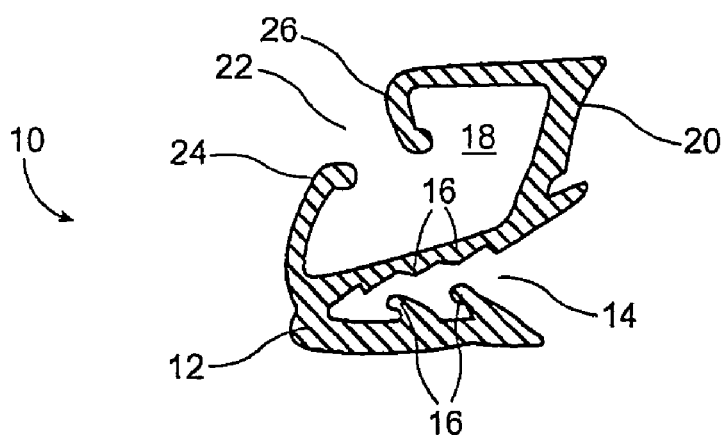
FIG. 2 is a cross-sectional view of the weatherseal of FIG. 1

Referring to FIGS. 1 and 2, there is illustrated a weatherseal referred to generally by reference numeral 10, formed by extruding a selected thermoplastic elastomer, most preferably TPV available under the trademark Santoprene. In the present application, the term "weatherseal" refers to a product used for sealing between surfaces, and in particular, to a thermoplastic material or to a thermoplastic elastomer intended for use in any application where metal and/or glass parts. The present application is primarily directed to the use of thermoplastic and thermoplastic elastomeric materials, and preferably to extruded TPV materials (TPV extrudates) in automotive applications. However, the skilled artisan will be aware that weatherseals are used in a wide variety of application. Accordingly, while the present application is described with particular reference to the automotive industry, the skilled artisan would be aware that the present application is equally applicable in other non-automotive applications.

With respect to the use of a thermoplastic material for weatherseal applications, the weatherseal may be formed of a thermoplastic material, or may be formed of a blend of materials, comprising thermoplastic material, thermoplastic elastomers and TPV. Other materials for blending or co-extrusion can include, for example, melt-blended olefin-based elastomers including polypropylene, polyethylene. Other components can include plasticizers, viscosity modifiers such as processing oils or esters, fillers, colourants, curing agents, antioxidants and other ingredients. Suitable fillers can include calcium silicate, clay, kaolin, talc, silica, diatomaceous earth, powdered mica, barium sulfate, aluminum sulfate, calcium sulfate, basic magnesium carbonate, glass fibers, and carbon fibers, provided the filler is used in an amount small enough not to adversely affect either the hardness or the coefficients of friction of the thermoplastic copolymer.

The components of the weatherseal are preferably selected so as to provide acceptable weatherseal properties with respect to, for example, known weatherseal performance properties such as flexibility, durability, hardness, UV resistance, and the like. The cross-section of the body is preferably adapted to be held in or on a particular portion of an opening which is to be sealed against the weather.

Weatherseal 10 generally has a height and width of approximately 2.5 cm, and can be of any desired length. It has a main U-shaped body section 12 which is adapted to be snugly fitted around the flange of a metallic frame section (not shown) of an automobile, and in particular, of an automobile window. The interior of U-shaped body section 12 has lips 16 which are used to provide a friction fit and weather resistant seal to the flange of the window opening of an automobile (not shown). The weatherseal may also be attached with suitable fastening means (not shown) or with adhesive. The cross-section of the weatherseal will vary depending upon its use, but in general, the U-shaped body section 14 provides a linear channel in the extruded thermoplastic weatherseal.

Shown above the main U-shaped body section 12, is a second channel area 18 surrounded by weatherseal area 20, which has an opening 22 through which the edge of a glass window would be positioned. At the edges of opening 22, area 20 includes two relatively thin edge sections 24 and 26. Edge sections 24 and 26 provide a seal against the glass inserted into second channel area 18.

Figure 3:
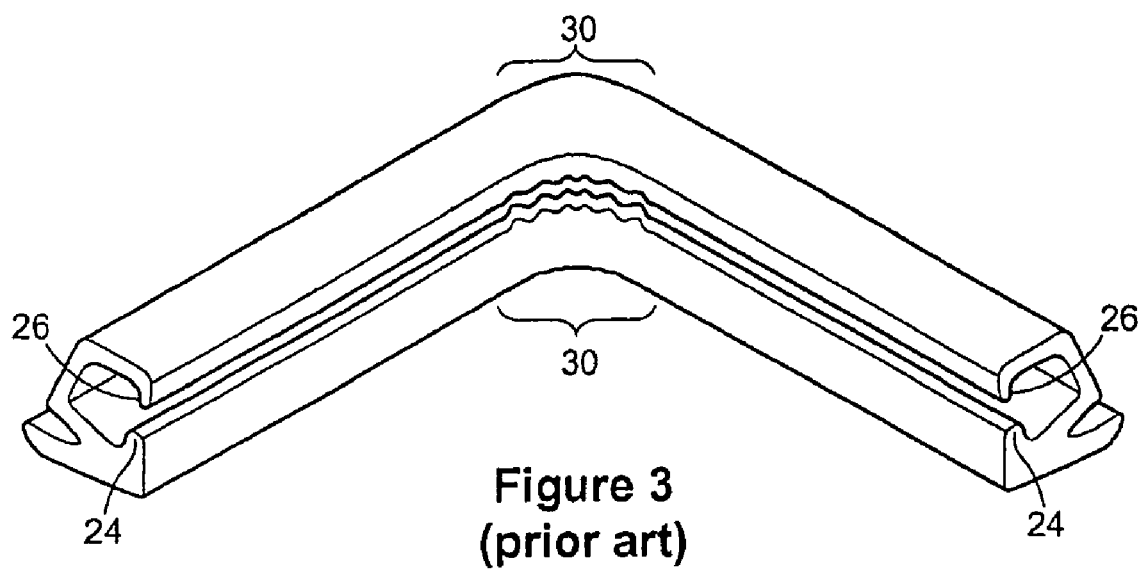
FIG. 3 is a perspective view of a bent section of weatherseal which has been bent by a process according to the prior art.

In FIG. 3, a weatherseal 10 is shown in persepective which has been bent in a manner consistent with the prior art, as generally described hereinbelow with respect to FIG. 5. Of particular note are edges 24 and 26. In the bent section 30, the thin edges 24 and 26 have buckled and produce a wavy appearance. In use, this buckled area would likely not provide acceptable weatherseal properties.

Figure 4:
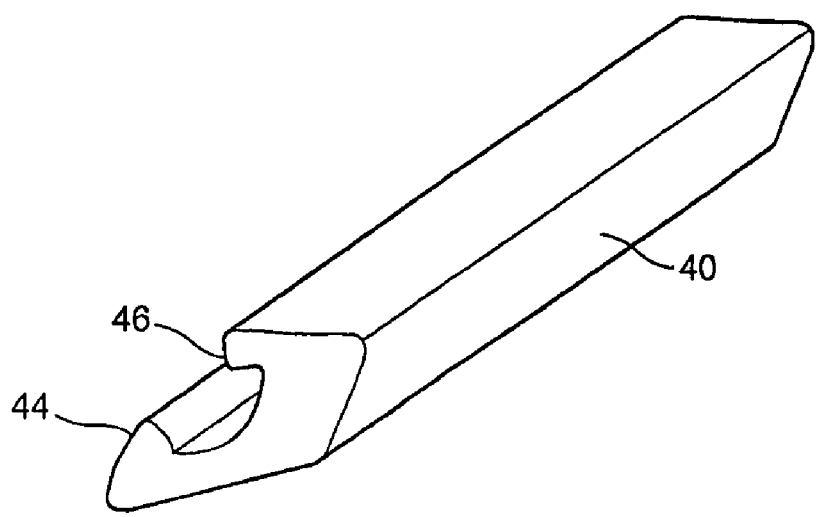
FIG. 4 is a perspective view of a support insert for use in the present invention.

FIG. 4 provides a perspective view of a support insert 40 of use in the present invention. Support insert 40 is made of flexible material, preferably silicon-based material, and is preferably approximately 15 to 30 cm in length, depending upon radius and has a profile and height and width so as to correspond with, and fit into channel area 18 of weatherseal 10. Support insert 40 has faces 44 and 46 which act to support edges 24 and 26 during the bending process.

Figure 5:
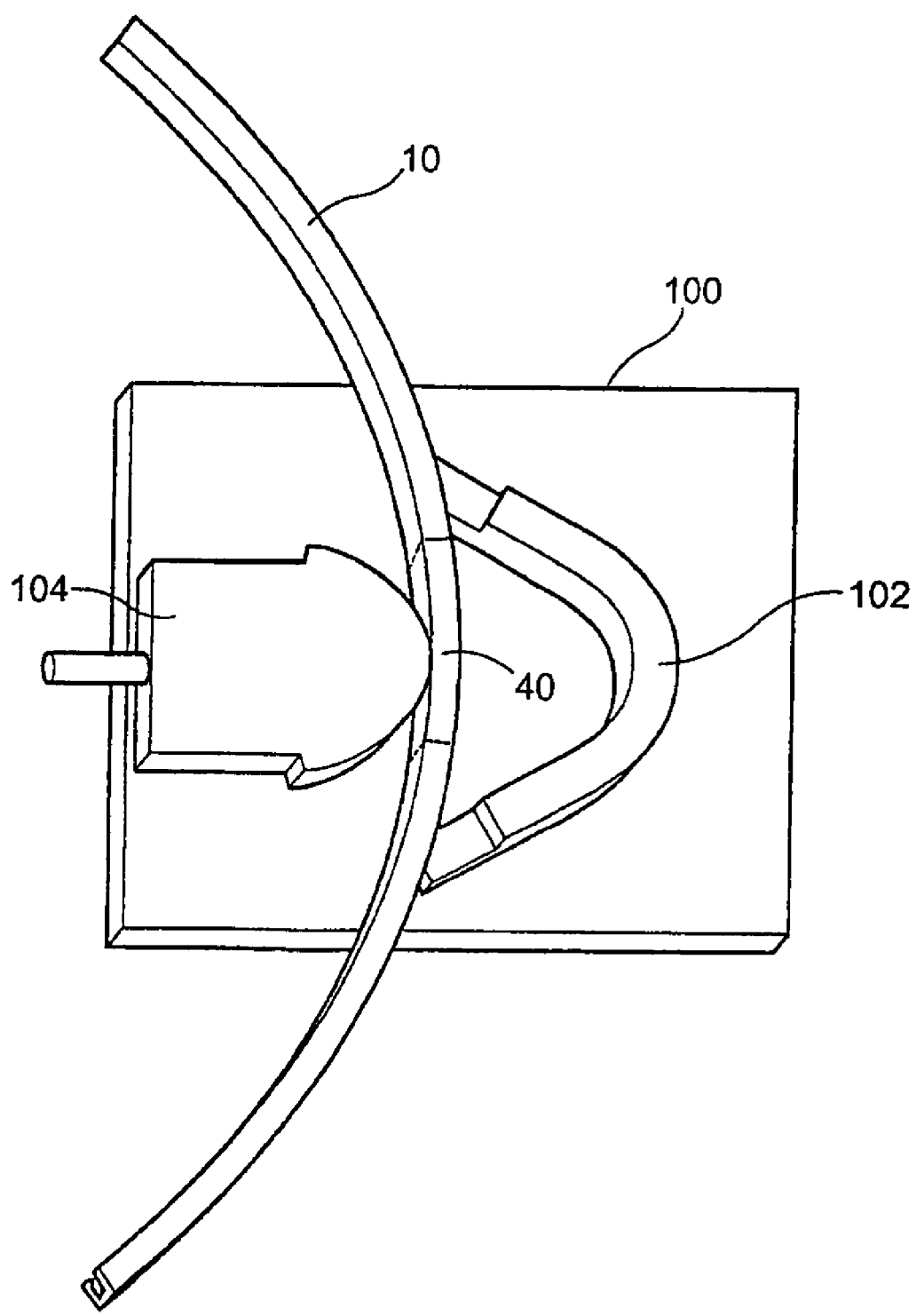
FIG. 5 is a perspective view of a weatherseal shown in an open bending press.
Figure 6:
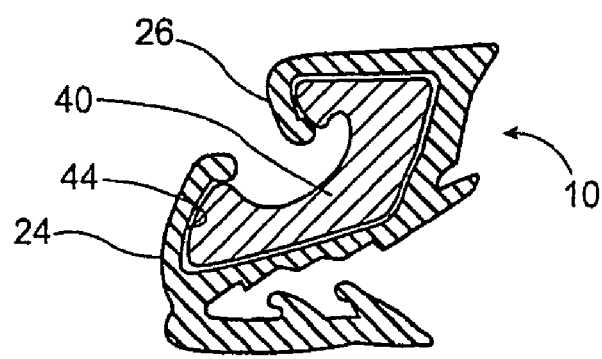
FIG. 6 is a cross-sectional view of a support insert which is shown in position in a weatherseal.

In FIG. 5, a bending press 100 is shown which can be used in the process of the present invention. Press 100 comprises a fixed back section 102 and a movable centre section 104 which can be moved from an open position, as shown, wherein linear, extruded thermoplastic weatherseal 10 can be inserted into the press 100, to a closed position wherein the weatherseal 10 is bent to the desired angle, as determined by the shape of the pressing faces of press 100. Shown in position for bending, in accordance with the process of the present invention, is support insert 40. FIG. 6 shows a cross-sectional view of weatherseal 10 with support insert 40 in place.

In operation, press 100 is opened and TPV weatherseal 10, with support insert 40, is inserted. Press 100 is then closed so that weatherseal 10 and support 40 are bent to the appropriate shape.

The support insert 40 is inserted into the thermoplastic weatherseal 10, and acts to form a support against which the surfaces prone to buckling, will rest. During the bending process, the support 40 insert acts to keep the supported surface in a linear alignment, and facilitates the setting of the thermoplastic into a non-buckled, bent configuration.

The support insert 40 is made from a flexible material which has a heat deformable temperature which is above the bending process temperature, and as such, is essentially unaffected by the bend process pressure and/or temperature. Any suitable material can be utilized provided it provides the support necessary during the pressing operation, and preferably does not significantly react with, adhere to, or otherwise affect the surface of the thermoplastic material being processed.

The support insert 40 should preferably be bendable in order to be inserted into the linear thermoplastic extrudate as a straight component, bent during the bending press, but returning to a straight configuration once removed from the bent, thermoplastic extrudate. As such, after the pressing operation, the support insert preferably returns to its original shape after removal from the thermoplastic material. In this fashion, the support insert 40 is available for reuse. It should be noted that while the support insert 40 might be pre-bent to some extent, or even to the final bend angle of the press, it is preferred that the support insert be essentially linear so as to facilitate insertion of the support insert 40 in a suitable position in a linear extrudate.

The weatherseal 10 is then heated to a temperature above its heat-deformable temperature, and held at that temperature for a sufficient length of time for the weatherseal 10 to permanently take on the bent shape established in press 100. When the bent shape has been set, press 100 is opened, weatherseal 10 is removed, and support insert 40 is removed. After removal, support insert 40 returns to its original linear shape, as shown in FIG. 4.

In the process of the present invention, the TPV material is heated above its heat-deformable temperature. This temperature is the value at which the material becomes essentially permanently set into, in this case, a bent position. Without being bound by theory, this temperature is not a melting temperature, or the like. For ease of processing, a typical heat-deformable temperature for the TPV materials, and preferably the TPV extrudates, is a temperature of at least 120° C. and preferably, is in the range of from 120° C. to 150° C. Further, in the process of the present invention, the thermoplastic material or extrudate, is placed into a press, similar to presses previously known within this industry. In this press, the weatherseal is heated (if it has not already been preheated) to a temperature above its heat-deformable temperature. The press is used to exert pressure on the thermoplastic material in order to force the thermoplastic material to take on the desired shape, and in particular for this application, the desired bend angle.

The pressure exerted on the thermoplastic material is provided merely to bend and hold the thermoplastic into the desired shape while it is heated to (or held at) the heat-deformable temperature. The desired bend is typically an essentially permanent bend of the linear thermoplastic material or extrudate to an angle of between 20° and 180°, and most preferably, to an angle of about 90° with about a 2.5 cm to 5.0 cm radius.

Figure 7:
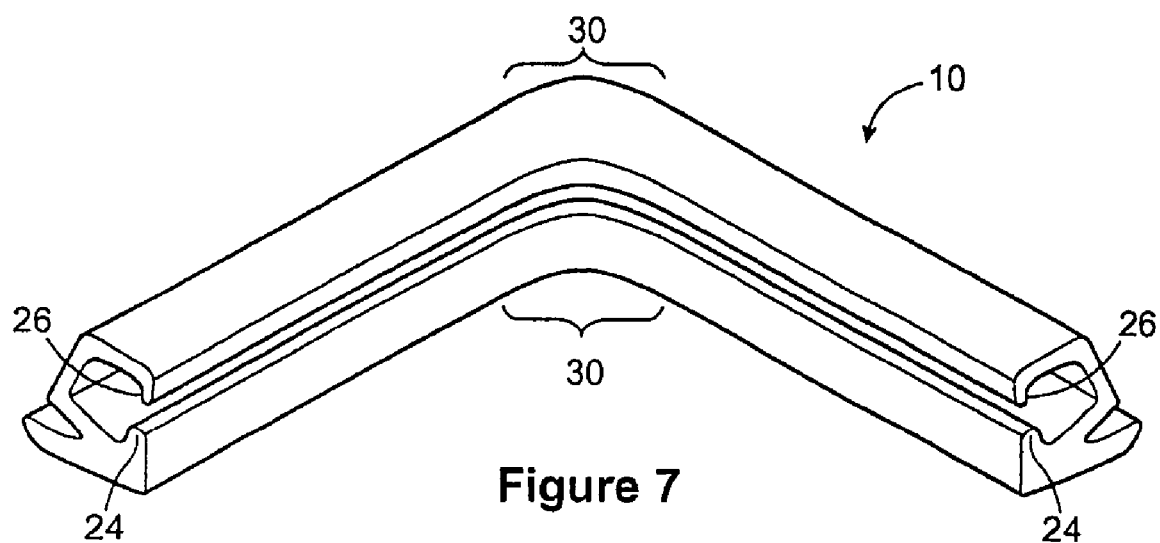
FIG. 7 is a perspective view of a bent section of weatherseal which has been bent by a process according to the present invention.

FIG. 7 shows a weatherseal which has been bent in accordance with the process of the present invention. In contrast to the weatherseal shown in FIG. 3, the weatherseal 10 shown in FIG. 7 is free from buckling on edges 24 and 26 in bend area 30. As such, the weatherseal shown in FIG. 7 provides greatly improved performance properties over the bent weatherseal shown in FIG. 3.

The process of the present invention provides a method for bending thermoplastic weatherseal to complementarily fit a door or window, or the like, which avoids the buckling problems encountered in the prior art. Thus, the technique herein described allows thermoplastic weatherseals to be used in an increased variety of applications without the need for additional weatherseal corner pieces or special joining processing, and allows the advantages of thermoplastic weatherseals and in particular TPV weatherseals to be used in a greater number of applications.

Thus, it is apparent that there has been provided, in accordance with the present invention, a process for producing bent thermoplastic weatherseals which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

What is claimed is:

1. A process for forming thermoplastic weatherseals, each including a pair of edge sections defining an opening, into a bent condition comprising:
    a) inserting a bendable linear support insert, having a pair of spaced apart faces, into at least a portion of a linear, straight thermoplastic weatherseal material such that the pair of spaced apart faces abuts and supports the respective pair of edge sections to provide a bendable weatherseal assembly;
    b) inserting said bendable weatherseal assembly into a bending press, and activating said press in order to bend said weatherseal assembly into a bent position;
    c) heating said weatherseal assembly in said bent position to a bending temperature greater than the heat deformation temperature of said thermoplastic material;
    d) maintaining said assembly in said press until said thermoplastic material is set into said bent condition; and
    e) removing said weatherseal assembly in said bent position from said press, and
    f) removing said support insert from said thermoplastic weatherseal material to allow said support insert to return to a linear shape.

2. A process as claimed in claim 1 wherein said linear, straight thermoplastic weatherseal material is extruded.

3. A process as claimed in claim 1 wherein said thermoplastic weatherseal material is TPV.

4. A process as claimed in claim 1 wherein said support insert is manufactured from a silicon based material.

5. A process as claimed in claim 1 wherein said heat deformation temperature is greater than 120° C.

6. A process as claimed in claim 1 wherein said support insert is essentially unaffected by heating to said bending temperature.

7. A process as claimed in claim 1 wherein said weatherseal assembly is bent to an angle of between 20° to 180°.

8. A process as claimed in claim 1 wherein said weatherseal material has, in cross section, thin sections which are supported by the surfaces of said support insert.

* * * * *